US007933635B2

(12) United States Patent  
Oh et al.

(10) Patent No.: US 7,933,635 B2  
(45) Date of Patent: Apr. 26, 2011

(54) ADJUSTMENT OF PARAMETERS BASED UPON BATTERY STATUS

(75) Inventors: Jang Geun Oh, Sooweon-si (KR); Jin Suk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 11/609,157

(22) Filed: Dec. 11, 2006

(65) Prior Publication Data

US 2007/0213101 A1    Sep. 13, 2007

(30) Foreign Application Priority Data

Mar. 9, 2006 (KR) ......................... 10-2006-0022055
Sep. 4, 2006 (KR) ......................... 10-2006-0084607

(51) Int. Cl.
*H04B 1/38* (2006.01)

(52) U.S. Cl. ...... 455/574; 455/572; 455/573; 455/343.5; 455/343.2; 455/343.4; 370/311

(58) Field of Classification Search .............. 370/311; 455/573–574, 343.1–343.6
See application file for complete search history.

(56) References Cited

U.S. PATENT DOCUMENTS

| | | | | |
|---|---|---|---|---|
| 5,870,685 | A * | 2/1999 | Flynn | 455/573 |
| 6,108,316 | A * | 8/2000 | Agrawal et al. | 370/311 |
| 6,275,712 | B1 * | 8/2001 | Gray et al. | 455/522 |
| 6,480,727 | B1 * | 11/2002 | Gerdisch | 455/574 |
| 6,501,949 | B1 * | 12/2002 | Singleton | 455/422.1 |
| 7,471,942 | B2 * | 12/2008 | Subramanian et al. | 455/343.2 |
| 2003/0190938 | A1 | 10/2003 | Ganton | |
| 2005/0003794 | A1 * | 1/2005 | Liu | 455/355 |
| 2005/0047382 | A1 | 3/2005 | Park et al. | |
| 2005/0249227 | A1 | 11/2005 | Wang | |
| 2006/0014516 | A1 * | 1/2006 | Cheng | 455/343.5 |
| 2006/0072496 | A1 * | 4/2006 | Nakamata et al. | 370/328 |
| 2006/0165031 | A1 * | 7/2006 | Wang et al. | 370/328 |
| 2006/0251130 | A1 * | 11/2006 | Greer et al. | 370/508 |
| 2007/0021155 | A1 * | 1/2007 | Yu et al. | 455/574 |
| 2007/0086471 | A1 * | 4/2007 | Igarashi et al. | 370/412 |
| 2008/0049653 | A1 * | 2/2008 | Demirhan et al. | 370/311 |
| 2008/0117881 | A1 * | 5/2008 | Golitschek Edler Von Elbwart et al. | 370/335 |
| 2008/0311961 | A1 * | 12/2008 | Cotevino et al. | 455/574 |

FOREIGN PATENT DOCUMENTS

| | | |
|---|---|---|
| EP | 1 513 293 | 3/2005 |
| EP | 1513293 A2 * | 3/2005 |
| EP | 1 684 466 | 7/2006 |
| EP | 1684466 A1 * | 7/2006 |

OTHER PUBLICATIONS

European Search Report dated May 21, 2007, Application No. 06127011.2, 4 pages.
Korean Intellectual Property Office Action for Application No. 10-2006-0084607 dated Jan. 27, 2010, 5 pages.

* cited by examiner

*Primary Examiner* — Jinsong Hu
*Assistant Examiner* — Qun Shen
(74) *Attorney, Agent, or Firm* — Fish & Richardson P.C.

(57) ABSTRACT

In a wireless local area network, a battery status of a mobile device is determined, battery status data based upon the battery status is generated, and a listen interval between a mobile device and an access point is adjusted based upon the battery status. Listen interval data is generated based upon the listen interval, an association request frame is wirelessly transmitted from the mobile device to the access point during the listen interval. The association request frame includes the battery status data and/or the listen interval data.

13 Claims, 12 Drawing Sheets

| | Mobile Devices | Battery Status (%) | Battery Status (binary) | Buffer Memory Size (Mbytes) |
|---|---|---|---|---|
| 600A | | | | |
| 601A | 1 | 100 | 000 | 10 |
| 602A | 2 | 100 | 000 | 10 |
| 603A | 3 | 100 | 000 | 10 |
| 604A | 4 | 100 | 000 | 10 |
| 605A | | | | 40 Mbytes of Preliminary Memory |

Figure 6B

| | Mobile Devices | Battery Status (%) | Battery Status (binary) | Buffer Memory Size |
|---|---|---|---|---|
| 600B | | | | |
| 601B | 1 | 77 | 000 | 10 Mbytes |
| 602B | 2 | 56 | 001 | 20 Mbytes |
| 603B | 3 | 32 | 010 | 30 Mbytes |
| 604B | 4 | 83 | 000 | 10 Mbytes |
| 605B | | | | 10 Mbytes of Preliminary Memory |

| Buffer Memory Size \ Battery Status | Under 40% | 40% ~ 70% | Over 70% |
|---|---|---|---|
| 5Mbyte | 200msec | 100msec | 50msec |
| 10Mbyte | 300msec | 200msec | 100msec |
| 20Mbyte | 400msec | 300msec | 200msec |

ADJUSTMENT OF PARAMETERS BASED UPON BATTERY STATUS

CROSS-REFERENCE TO RELATED APPLICATION

This application claims priority to Korean Patent Application No. 10-2006-0022055, filed on Mar. 9, 2006, and Korean Patent Application No. 10-2006-0084607, filed on Sep. 4, 2006, which are incorporated herein by reference.

BACKGROUND

1. Field

The present disclosure relates to wireless communications, and one particular implementation relates to the adjustment of a buffer memory size at an access point based upon a battery status of a mobile device operating in a wireless local area network environment.

2. Description of the Related Art

A Wireless Local Area Network (WLAN) is a network environment that provides wireless LAN services to mobile devices, such as Personal Digital Assistants (PDAs), laptop computers with wireless LAN cards, and smart phones. Mobile devices connect to a WLAN though an access point, which serves as a relay device for communications in a WLAN system.

WLANs systems have several advantages when compared to wired LANs. Because of their wireless nature, WLANs allow for greater mobility of networked devices, as well as easier deployment, growth, and configuration. However, WLANs have lower transmission speeds than wired LANs and are prone to signal interferences due the nature of wireless communications. In addition, to stay physically mobile in a WLAN, wireless devices connected to a WLAN may need to rely on their batteries for operation.

SUMMARY

According to one general aspect, a battery status of a mobile device is determined, battery status data based upon the battery status is generated, and a listen interval between a mobile device and an access point is adjusted based upon the battery status. Additionally, listen interval data is generated based upon the listen interval, and an association request frame is wirelessly transmitted from the mobile device to the access point during the listen interval, where the association request frame includes the battery status data and the listen interval data. The association request frame is received at the access point and a buffer memory is assigned at the access point for the mobile device, where a size of the buffer memory is based upon the battery status data and/or the listen interval data. An association response frame is wirelessly transmitted from the access point to the mobile device.

Implementations may include one or more of the following features. For example, the access point may store data intended for the mobile device in the assigned buffer memory and wirelessly transmit the data stored in the assigned buffer memory to the mobile device. In addition, the battery status may be indicative of a remaining battery power. In another example, the listen interval is expressed by time T when the remaining battery power is above 70% of maximum battery power, by time 2T when the remaining battery power is at 40% to 70% of maximum battery power, and by time 5T when the remaining battery power is under 40% of maximum battery power. In yet another example, the size of the buffer memory is expressed as size S when the remaining battery power is above 70% of maximum battery power, as size 2S when the remaining battery power is at 40% to 70% of maximum battery power, and as size 3S when the remaining battery power is under 40% of maximum battery power. The association request frame may further include capability data, service set identification ("SSID") data, and/or supported rate data. The association response frame may further include capability data, status code data, an association identification ("AID"), supported rate data, and/or an indication of a size of a buffer memory at the access point. The battery status data may be generated as a binary number. In addition, adjusting the listen interval may be based upon the battery status and a predetermined battery status threshold.

According to another general implementation, a device includes a battery and a controller configured to determine a battery status of the battery, to generate battery status data based upon the battery status, to adjust a listen interval between the mobile device and an access point based upon the battery status, and to generate listen interval data based upon the listen interval. The device also includes a transceiver which is configured to wirelessly transmit an association request frame from the mobile device to the access point during the listen interval, with the association request frame including the battery status data and/or the listen interval data, and to wirelessly receive an association response frame from the access point, with the association response frame further including data of a size based upon the battery status data and/or the listen interval data.

According to another general implementation, a device includes a transceiver configured to wirelessly receive an association request frame from a mobile device, with the association request frame including battery status data indicative of a battery status of the mobile device, and/or listen interval data indicative of a listen interval. The transceiver is also configured to wirelessly transmit an association response frame from the access point to the mobile device, with the association response frame further including data stored in a buffer memory. Furthermore, the access point device includes a controller configured to assign a size of the buffer memory at the access point based upon the battery status data and/or the listen interval data. The access point also includes a memory medium configured to store the data in the buffer memory.

According to another general implementation, a system includes a mobile device and an access point device. The mobile device further includes a battery, a controller, and a transceiver. The controller is configured to determine a battery status of the battery, to generate battery status data based upon the battery status, to adjust a listen interval based upon the battery status, and to generate listen interval data based upon the listen interval. The transceiver is configured to wirelessly transmit an association request frame during the listen interval, with the association request frame including the battery status data and/or the listen interval data, and to wirelessly receive an association response frame, with the association response frame further comprising data sized based upon the battery status data and/or the listen interval data. The access point device further includes a transceiver, a controller, and a memory medium. The transceiver is configured to wirelessly receive the association request frame from a mobile device, and to wirelessly transmit the association response frame to the mobile device, with the association response frame further comprising data stored in a buffer memory. The controller configured to assign the buffer memory at the access point, a size of the buffer memory based upon the battery status data and/or the listen interval data. The memory medium is configured to store the data in the buffer memory.

According to another general implementation, a system includes an access point device that includes a memory medium configured to store data in a buffer memory and a transceiver configured to wirelessly transmit an association response frame to a mobile device, with the association response frame further including an indication of a size of the buffer memory at the access point device. In addition, the system includes a mobile device which further includes a transceiver configured to receive the association response frame. The system also includes a controller configured to assign a power management status and/or a listen interval between the mobile device and the access point device based upon the indication of the size of the buffer.

According to another general implementation, a battery status of a mobile device is determined and is indicative of remaining power. Battery status data based upon the battery status is generated, and a listen interval is adjusted between the mobile device and an access point based upon the battery status. Additionally, listen interval data is generated based upon the listen interval, and an association request frame is wirelessly transmitted from the mobile device to the access point during the listen interval, with the association request frame including the battery status data and the listen interval data.

Implementations may include one or more of the following features. For example, adjusting the listen interval between the mobile device and the access point based upon the battery status may further include increasing the duration of the listen interval when the remaining battery power decreases and decreasing the duration of the listen interval when the remaining battery power increases.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1:
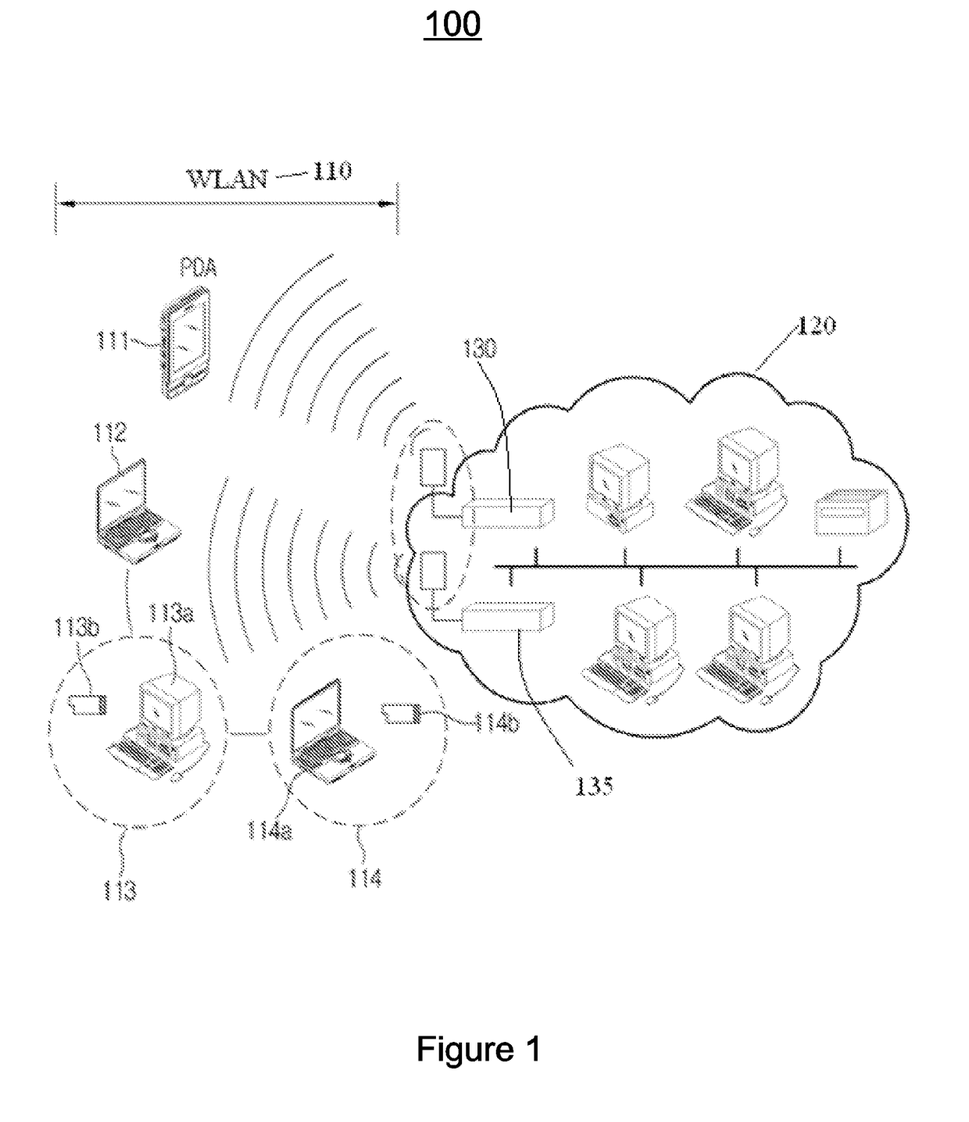
FIG. 1 illustrates an exemplary configuration of a network communications system.

FIG. 1 illustrates one exemplary configuration of a network communications system 100. The network communications system 100 includes a wireless local network area (WLAN) segment 110 and a wireline network segment 120. The WLAN segment 110 may be configured to provide wireless communications for devices connected to WLAN 110. The wireline network segment 120 may interconnect one or more local area networks (LANs) and/or a wide area networks (WANs). The WLAN segment 110 and the wireline network segment 120 may be interconnected through access points 130 and 135, which act as relay devices for network communications, such as hubs, bridges, switches, or routers.

Devices equipped with a wireless networking capability may connect to the WLAN segment 110. Such devices may include, but are not limited to, a PDA 111 with a wireless capability, a wireless laptop device 112, a desktop system 113 that includes a computer device 113a equipped with a WLAN peripheral component interconnect card (PCI) 113b, or a laptop system 114 that includes a laptop device 114a equipped with a WLAN PCI card 114b. Wireless devices 111 to 114 are connected in the WLAN segment 110 through network relay devices with wireless capability, such as access points 130 and 135.

Figure 2:
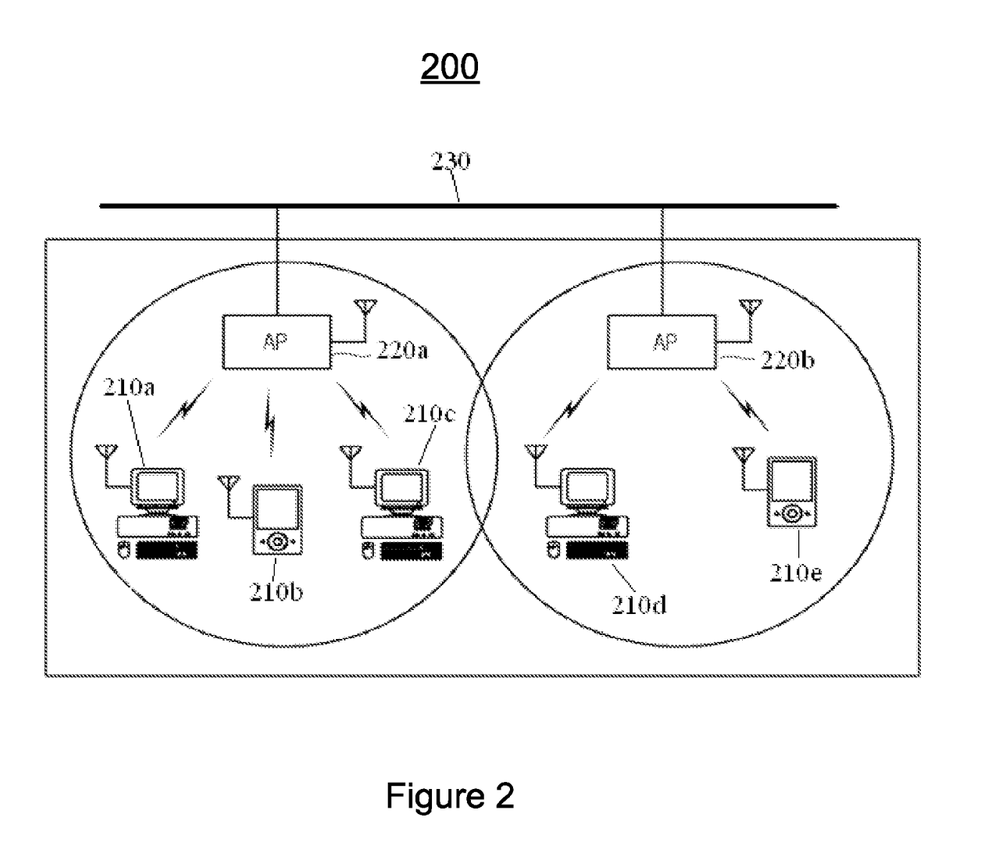
FIG. 2 illustrates wireless communications between access points and mobile devices within a WLAN environment.

FIG. 2 illustrates an example of wireless communications between access points and mobile devices within a WLAN environment 200. Briefly, wireless devices 210a-210c communicate with each other through an access point 220a, while wireless devices 210d and 210e communicate with each other through an access point 220b. The access point 220a and the access point 220b may connect to each other via a network segment 230, which may be either a wireless segment or a wireline segment. Connectivity between the access point 220a and the access point 220b may enable devices 210a-210e to communicate with each other, as well as devices in other networks. Mobile devices 210a-210e may be any communication devices equipped with radio frequency (RF) cards for enabling radio communications in the WLAN environment 200. For example, mobile devices 210a-210e may include laptop or desktop computers, personal communication service terminals, PDAs, smart phones, cellular phones, and/or WLAN terminals. Additionally or alternatively, mobile devices may include Network Interface Cards (NICs) for enabling communications according to IEEE® 802.3 (Ethernet) and/or IEEE® 802.11 (WLAN) standards.

Mobile devices 210a-210e connect to access points 220a-220b for a predetermined interval, known as listen interval, to receive and/or transmit data. In order to connect to access points 220a-220b, mobile devices 210a-210e need to associate themselves with access points 220a-220b.

One such exemplary association procedure is described below. The association procedure may take place during connection or reconnection of the mobile device 210a to the access point 220a. The mobile device 210a transmits an association request frame to the access point 220a-220b. The association request frame may include various control data necessary for associating the mobile device 210a with the access point 220a. The access point 220 processes the association request frame and replies to the mobile device 210a with an association response frame. The association response frame may also include various control data necessary for associating the mobile device 210a with the access point 220a. Once the association response frame has been processed at the mobile device 210a, an association is created between the mobile device 210a and the access point 220a. In addition, as the association is established, the access point 220a may allocate an association identification ("AID") for the mobile device 210a. The AID may help the access point 210a to temporarily store the data transmitted for the mobile device 210 in a buffer memory when the mobile device 210a is not connected to the access point 220a. When the mobile device 210a reconnects to the access point 220a during the next listen interval, the access point 210a uses the AID to retrieve the data temporarily stored in the buffer memory for the mobile device 210a and transmit that data to the mobile device 210a. Consequently, access points 220a-220b may maintain separate buffer memories for each of the mobile devices 210a-210e. These buffer memories may be associated with the AIDs of mobile devices 210a-210e.

Physical mobility is an important feature of the WLAN environment 200. Consequently, to stay physically mobile, mobile devices 210a-210e may rely on their batteries, instead of power outlets, to continue operating. However, transmitting or receiving data in the WLAN environment 200 drains battery power. In particular, every time mobile devices 210a-210e connect to access points 220a-220b during the listen interval, some battery power is consumed. As a result, wireless operation in the WLAN environment 200 may shorten an operable time during which mobile devices 210a-210e have sufficient battery power to continue working without exchanging batteries or recharging from power outlets.

Figure 3:
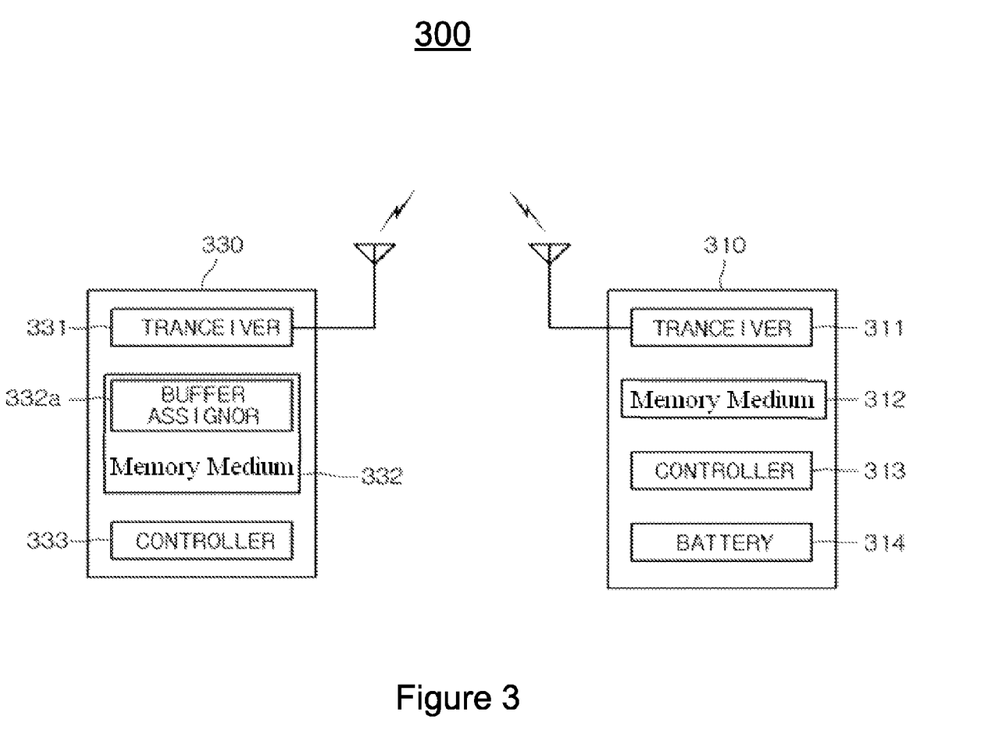
FIG. 3 is a block diagram illustrating exemplary configurations of an access point and a mobile device.

FIG. 3 is block diagram illustrating exemplary configurations of a system 300 including an access point 330 and a mobile device 310. The mobile device 310 includes a transceiver 311, a memory medium 312, a controller 313, and a battery 314. The controller 313 controls the operation of various components of the mobile device 310, such as the memory medium 312, or the transceiver 313, which is used to receive or transmit data from the access point 330. For example, the controller 313 may cause the transceiver 311 to transmit an association request frame to the access point 330 during the association process described with respect to FIG. 2. The association request frame may include battery status data and/or listen interval data, which may be configured as a 16-bit long field. The memory medium 312 may store data that is about to be transmitted to the access point 330 or has been received from the access point 330. In addition, the memory medium 312 may be used to store any necessary software code for enabling the operation of the mobile device 310, including the code for enabling the operation of the controller 313. Finally, the battery 314 powers the mobile device 310 and its various components. Additionally, the mobile device 330 may include other functional blocks useful for its operation, such as a display, a keyboard, or a data processing unit.

The mobile device 310 may wish to save its battery power by adjusting the length of the listen interval in the WLAN environment. In one example, when connecting to the access point 330, the mobile device 310 determines its battery status based on, for example, the remaining power, generates battery status data based upon the battery status, adjusts a listen interval between the mobile device and an access point based upon the battery status, and generates listen interval data based upon the listen interval.

The listen interval may be adjusted during each access attempt to the access point 330 based on the battery status of the mobile device 310. Generally, the battery of the mobile device 310 is drained each time the mobile device 310 attempts to access the access point 330. Thus, one way for the mobile device 310 to reduce its consumption of battery power is to reduce the number of access attempts to the access point 330. This may be achieved by increasing the duration of the listen interval when the battery power of the mobile device 310 decreases. As the duration of the listen interval is increased, the amount of data that can be received or transmitted by the mobile device 310 is increased. Consequently, if the amount of received/transmitted data remains the same for the mobile device 310, the actual number of required access attempts decreases with the increased duration of the listen interval. Thus, increasing the duration of the listen interval saves the battery power of the mobile device 310 by reducing the number of times that the mobile device 310 needs to access the access point 330.

The access point 330 includes a memory medium 332, a controller 333, and a transceiver 331. The memory medium 332 includes a buffer assignor 332a, which is configured to analyze an association request frame received from the mobile device 310 and to retrieve the battery status data and/or the listen interval data from the received association request frame. The controller 333 controls the operation of various components of the access point 330, such as the memory medium 332 and the transceiver 331. For example, the controller 333 may control the creation of an association response frame, which is a response to the association request frame received from the mobile device 310. The controller 333 may also control the transceiver 331 to transmit the association response frame to the mobile device 310. Additionally, the access point 330 may include other functional blocks useful for its operation, such as a data processing unit.

As discussed with respect to FIG. 2, the access point 330 allocates an AID for each mobile device 310 with which it has successfully established an association. The AID references the portion of the buffer memory where the access point 330 temporarily stores the data sent to the mobile device 310 by other network devices or the access point 330 itself. As mentioned above, adjusting the duration of the listen interval for the mobile device 310 changes the amount of data that the mobile device 310 can receive or transmit during that interval. Therefore, when the mobile device 310 adjusts the listen interval based on its battery status, the access point 330 should also adjust the size of the buffer memory assigned to the mobile device 310, so that the buffer memory size reflects the amount of data that the mobile device 310 receives or transmits during the listen interval.

For example, if the listen interval of the mobile device 310 becomes longer, the number of times the mobile device 310 accesses the access point 310 to receive or to transmit data becomes smaller. As a result, the access point 330 should increase the buffer memory size allocated for the data received/transmitted to mobile device 310, so that more data can be received or transmitted during the longer listen interval.

In one particular example, the listen interval of the mobile device 310 may be set to 100 msec and the battery status (e.g., remaining power expressed as a percentage of the maximum power) may be periodically determined. Maximum power indicates the power of a fully charged battery, which may be less than originally stated by the battery's manufacturer. If the battery status is in a range of 40% to 70% of the maximum battery power, the listen interval may be changed to 200 msec. If, on the other hand, the battery status is under 40% of the maximum battery power, the listen interval may be further increased to 500 msec to save the battery power.

As described above, when the listen interval is increased at the mobile device 310 based on a battery status, the access point 330 may need to buffer more data to be communicated to or from the mobile device 310. Therefore, the mobile device 310 should notify the access point 330 when the mobile device 310 adjusts the duration of its listen interval. In particular, the controller 313 of the mobile device 310 includes battery status data and/or listen interval data in the association request frame that is transmitted to the access point 330 when the mobile device 310 connects or reconnects to the access point 330. The association request frame is wirelessly transmitted to the access point 330 through the transceiver 311 of the mobile device 310. The controller 333 of the access point 330 checks the battery status data and/or listen interval data included in the received association request frame, and allows the buffer assignor 332a to assign the buffer memory size based upon the battery status and/or listen interval of the mobile device 310. The assignor 332 may assign a new memory buffer for the mobile device 310.

Alternatively, if the memory buffer has been previously assigned to the mobile device 310, the assignor 332 may use the previously assigned memory buffer instead of allocating a new memory buffer for the mobile device 310. The assignor 332 may also adjust the size of the previously allocated memory buffer or the newly allocated memory buffer and clear/change their contents. Once the assignor adjusts the memory buffer size for the mobile device 310, the access point 330 wirelessly transmits an association response frame to the mobile device 310 through the transceiver 331. The association response frame may include the buffer memory size allocated for the mobile device 310 at the access point 330.

Figure 4:
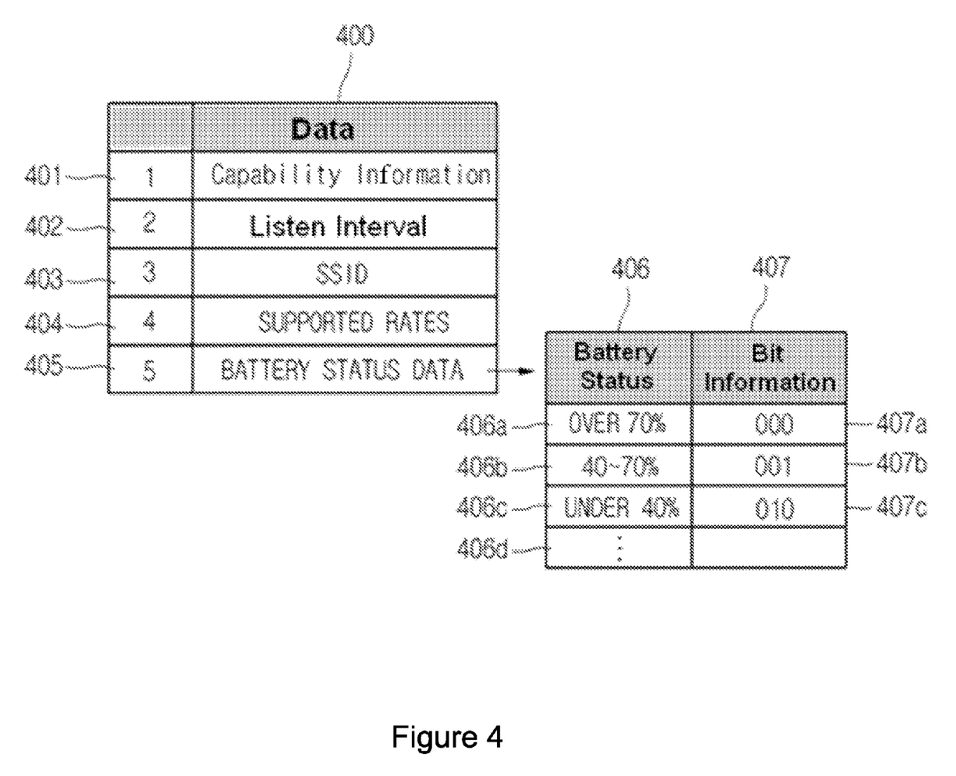
FIG. 4 illustrates an exemplary format of an association request frame.

FIG. 4 illustrates an exemplary format of an association request frame transmitted by a wireless device to an access point at a time of connecting or reconnecting. The association request frame 400 includes a capability information 401, a listen interval 402, a service set identification (SSID) 403, supported rates 404, and battery status data 405. The battery status data 405 may include various data describing the status of the battery.

In one example, the battery status data may include the battery status 406, which represents a remainder of a battery power expressed as a percentage of the maximum battery power. The battery status 406 may be represented as a binary number in bit information data 407 in the battery status data 405. For example, when the battery status 406 indicates that the current battery power is over 70% of the maximum battery power (406a), the battery status 406 is represented by a binary number "000" (407a). In another example, when the battery status 406 indicates that the current battery power is in a range of 40% to 70% of the maximum battery power (406b), the battery status is represented by a binary number "001 " (407b). In yet another example, when the battery status 406 indicates that the current battery power is under 40% of the maximum battery power (406c), the battery status is represented by a binary number "010" (407c). The battery status 406 also may be represented by a specific percentage expressed as any type of a reference numeral 406d, such as 37%, 12%, or 68.9%.

In yet another example, the battery status data may include a power management status of the mobile device. The power management status is indicative of power management operations performed by the mobile device. For example, the power management status may include a sleep mode status, a hibernation mode status, a fully awake status, an "LCD-is-off" status, or a "hard-drive-is-off" status.

Figure 5:
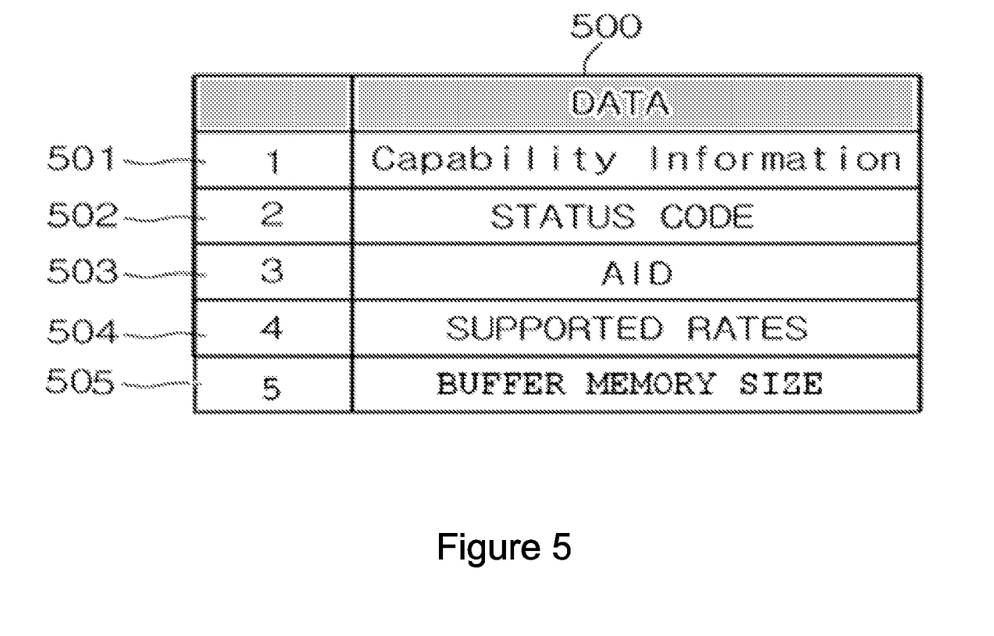
FIG. 5 illustrates an exemplary format of an association response frame.

FIG. 5 illustrates an exemplary format of an association response frame transmitted by an access point to a wireless device in response to an association request frame. The association response frame 500 includes capability information 501, a status code 502, an AID 503, supported rates 504, and a buffer memory size 505. The buffer memory size 505 indicates the size of the buffer memory assigned to a mobile device by an access point after processing of the association request frame. For example, referring back to FIG. 3, the buffer memory size 505 may specify the size of the buffer memory assigned to the mobile device 310 by the buffer assignor 332a based upon the battery status data and/or listen interval data included in the association request transmitted from the mobile device 310 to the access point 330.

Figure 6A:
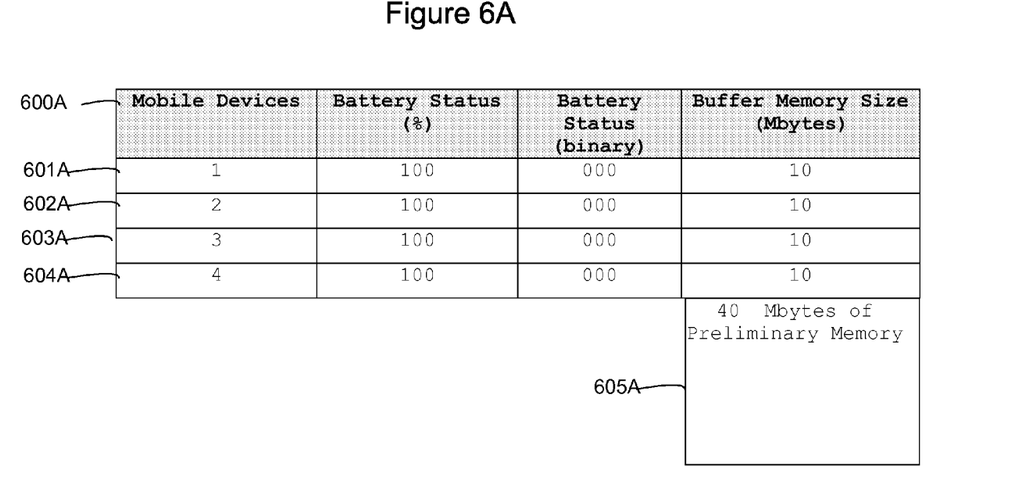
FIGS. 6A and 6B illustrate examples of adjusting buffer memory size at an access point.
Figure 6B:
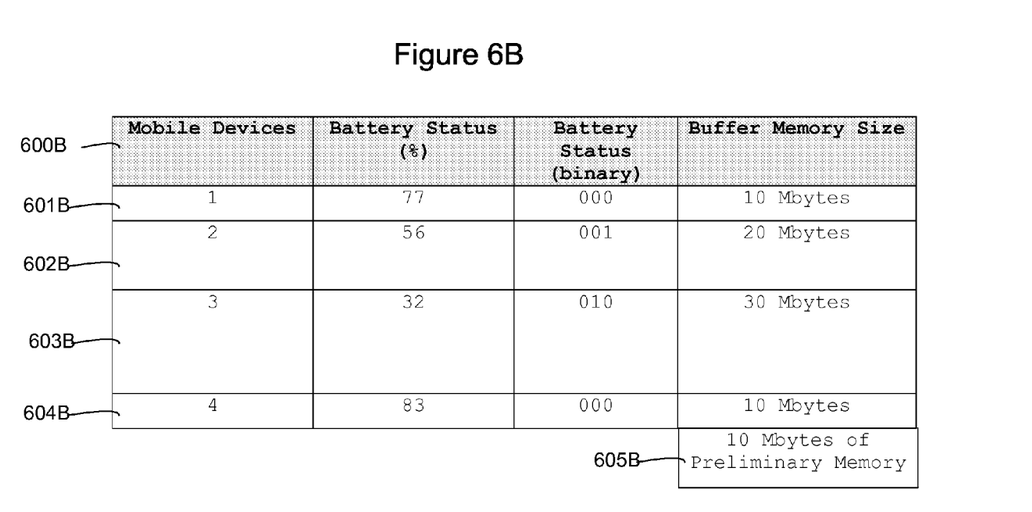

FIGS. 6A and 6B illustrate examples of the adjustment of a buffer memory size at an access point. In particular, rows 601A-604A in a table 600A in FIG. 6A show battery statuses along with initial allocations of buffer memory sizes for mobile devices 1-4 connected to the access point. Initially, rows 601A-604A show battery statuses, which indicate that the batteries of the mobile devices 1-4 are at their maximum power (i.e. fully charged). Here, the table 600A shows the battery status as a percentage of the maximum battery power and/or as a binary number. The binary number corresponds to one of the three predetermined ranges for indicating battery status—"000" for the times when the remaining battery power is above 70% of the maximum battery power, "001" for the times when the remaining battery power is between 40% and 70% of the maximum battery power, and "010" for the times when the remaining battery power is below 40% of the maximum battery power. In any event, the access point initially allocates 10 Mbytes for each mobile device. In addition, the access point maintains a pool of preliminary memory 605A from which the access point may allocate additional memory to mobile devices 1-4, when necessary.

Now turning to FIG. 6B, a table 600B shows how the access point adjusts buffer memory sizes when the battery status and/or listen interval changes for mobile devices 1-4 from FIG. 6A. For example, as indicated by new battery statuses in rows 601B-604B, when the battery status of the mobile device 1 changes to 56% of maximum power or "001" (e.g., falling in the 40%-70% cutoff), the access point adjusts the buffer memory size for that mobile device to 20 Mbytes (602B). In another example, when the battery status for the mobile device 3 changes to 32% of maximum power or "010" (e.g., falling in the below 40% cutoff), the access point adjusts the buffer memory size for that device to 30 Mbytes (603B). Because the battery statuses for mobile devices 1 and 4 are still above the 70% cutoff, the access point has not changed the buffer memory allocations for these devices. As shown in FIG. 6B, the access point takes the additional memory for the buffer memories allocated for devices 2 and 3 from the preliminary memory 605A, which is reduced from 40 Mbytes to 10 Mbytes after the additional 30 Mbytes have been allocated for the buffers of devices 2 and 3 by the access point (605B).

Figure 7:
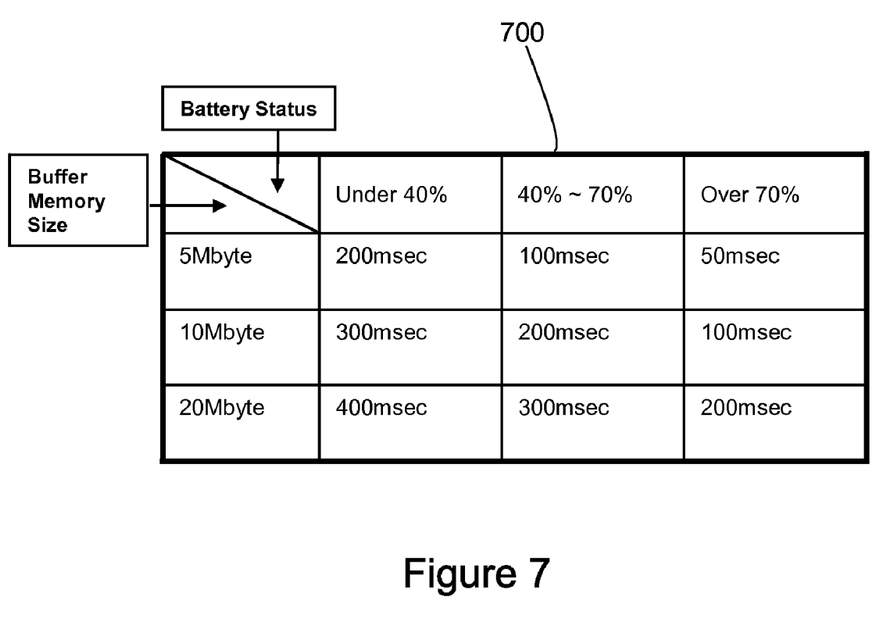
FIG. 7 is a table illustrating exemplary values for a listen interval, a buffer memory size, and a battery status.

FIG. 7 is a table 700 illustrating exemplary values for a listen interval, a buffer memory size, and a battery status. The duration of the listen interval is increased when the battery status indicates that the remaining power of the battery is decreasing. Further, the buffer memory size increases with the increasing listen interval. The buffer memory size may be adjusted by an access point based upon the listen interval data or the battery status data. The listen interval also may be adjusted by a mobile device based on the battery status or the buffer memory size allocated to the mobile device by the access point.

Figure 8:
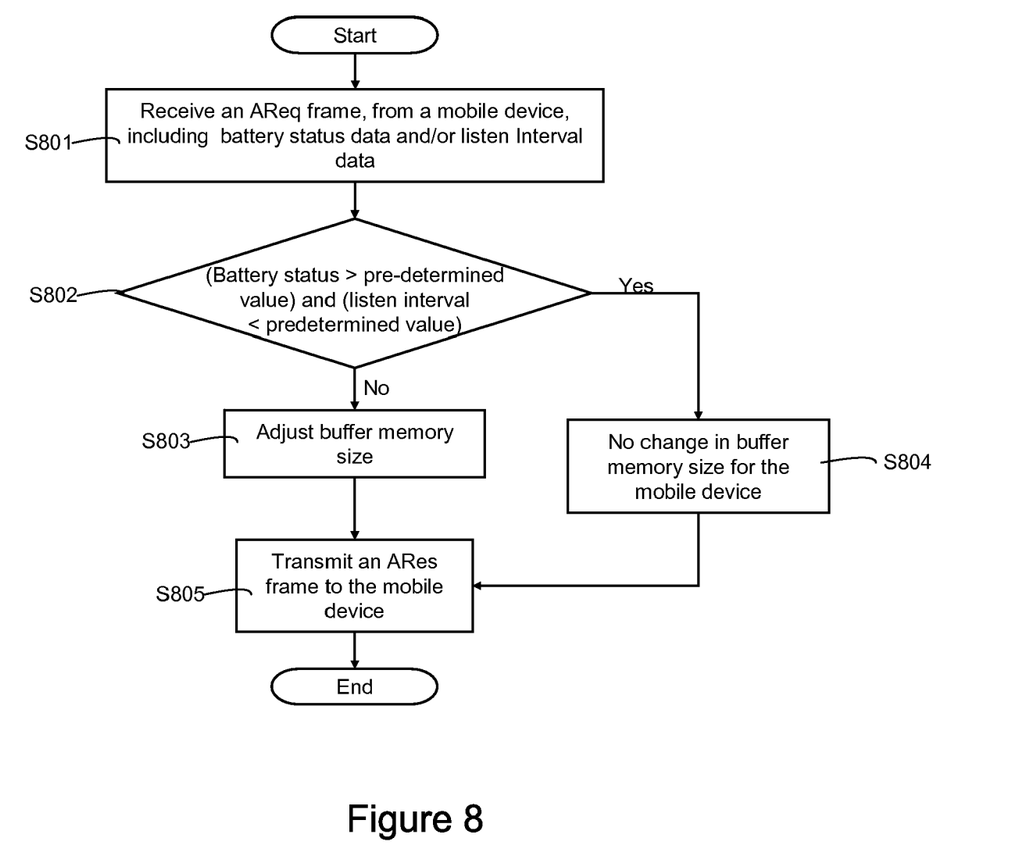
FIGS. 8 and 9 are flowcharts illustrating buffer memory size adjustment at an access point.

FIG. 8 is a flowchart illustrating adjustment of buffer memory size at an access point 330, which was discussed with respect to FIG. 3. The access point 330 receives an association request frame from the mobile device 310, where the association request frame includes battery status data and/or listen interval data (S801). In one example, the battery status data may include a battery status, which represents the remainder of the battery power expressed as a percentage of the maximum battery power of the mobile device 310. Additionally or alternatively, the battery status may be represented as a binary number as bit information data. The listen interval data may include the duration of the listen interval.

The access point 330 checks whether the battery status is greater than one pre-determined value (e.g., >70%) (S802). The access point 330 may also check whether the listen interval is less than another predetermined value (e.g. less than 200 msec). If the battery status is not greater than one pre-determined value or the listen interval is not less than another predetermined value, then the access point 330 may adjust a buffer memory size for the mobile device 310 (S803). The buffer memory size may be adjusted (i.e. increased or decreased) by a pre-determined amount, as discussed with respect to examples shown in FIGS. 6 and 7. The access point 330 may also use a different algorithm to compute the amount by which to increase the buffer memory size.

If the battery status is greater than the first pre-determined value and the listen interval is less than the second pre-determined amount, then the access point 330 does not change the buffer memory size for the mobile device 310 (S804). The access point 330 transmits an association response frame to the mobile device. An association response frame was discussed with respect to FIG. 5 and may include the current size of a buffer memory allocated by the access point 330 to the mobile device 310.

Figure 9:
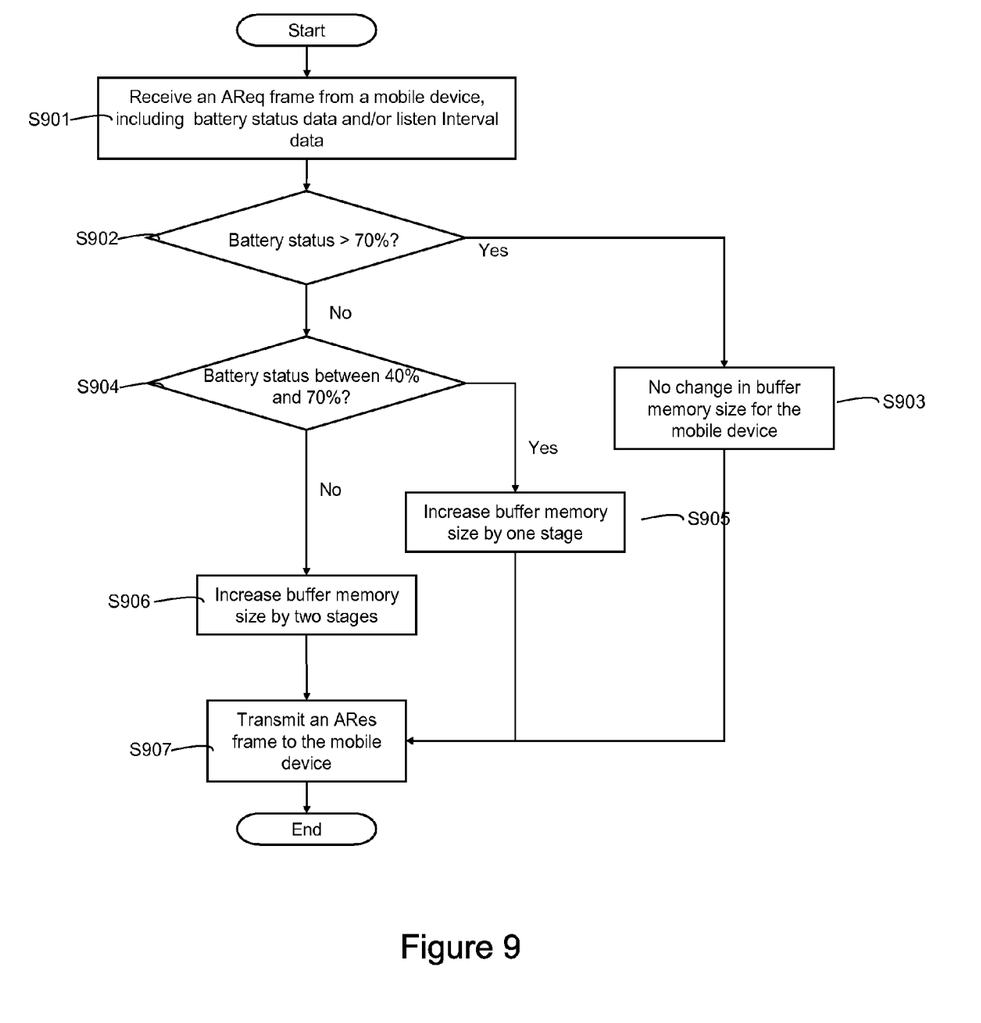

FIG. 9 is a flowchart illustrating another example of buffer memory size adjustment based on battery status at the access point 330, which was discussed with respect to FIG. 3. For example, the access point 330 receives an association request frame from a mobile device 310, which includes battery status data (S901). As previously described, the battery status data may include a battery status that represents the remainder of the battery power at the mobile device 310 expressed as a percentage of the maximum battery power.

The access point 330 checks whether the battery status is greater than 70% of the maximum battery power. If the battery status is greater than 70% of the maximum battery power, then the access point 330 does not adjust the buffer memory size for the mobile device 310 (S903). If, on the other hand, the battery status is less than 70%, the access point 330 checks whether the battery status is between 40% and 70% of the maximum battery power (S904). If the battery status is between 40% and 70% of the maximum battery power, then the access point 330 increases the buffer memory size by one stage (S905), which is a pre-determined size that may be chosen to allow for optimal memory allocation at the access point 330. Some of the exemplary pre-determined buffer memory sizes were discussed with respect to FIGS. 6 and 7. For example, the access point 330 may increase the buffer memory size for the mobile device 310 by 10 Mbytes. If the battery status of the mobile device 310 is less than 40% of the maximum battery power, then the access point 330 increases the buffer memory size by two stages (S906). For example, the access point 330 may increase the buffer memory size for the mobile device 310 by 20 Mbytes. The access point 330 transmits an association response frame to the mobile device 310 (S907). The association response frame was discussed with respect to FIG. 5 and may include the current size of a buffer memory allocated by the access point 330 to the mobile device 310.

Figure 10:
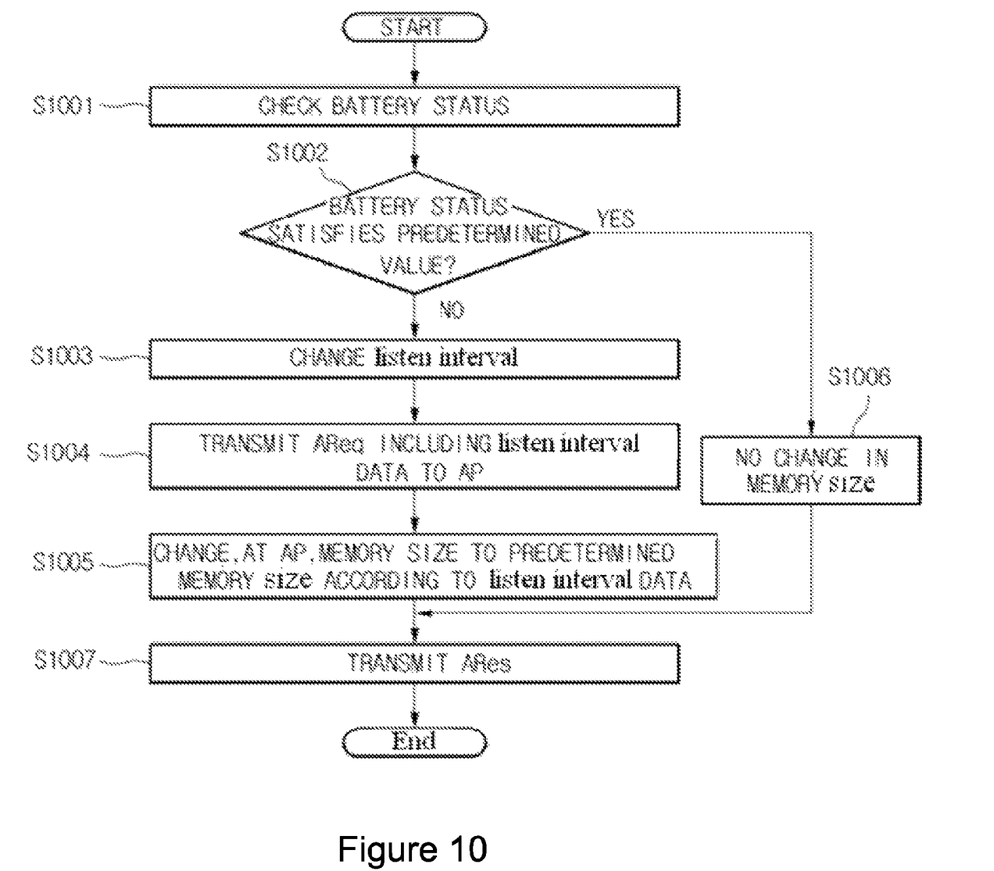
FIG. 10 is a flowchart illustrating listen interval adjustment at a mobile device.

FIG. 10 is a flowchart illustrating adjustment of a listen interval at a mobile device. The mobile device checks a present battery status (S1001). When the checked battery status is greater than a predetermined value (S 1002), the assigned memory size is not changed (S 1006).

When the checked battery status is less than the predetermined value, a controller of the mobile device adjusts the listen interval according to the battery status data (S1003). Next, an association request frame is transmitted to an access point (S 1004). The association request frame may include a battery status data and a listen interval data, as previously discussed with respect to FIG. 4. The access point adjusts the buffer memory size based on the received listen interval data (S1005). The access point transmits an association response to the mobile device (S1007).

Figure 11:
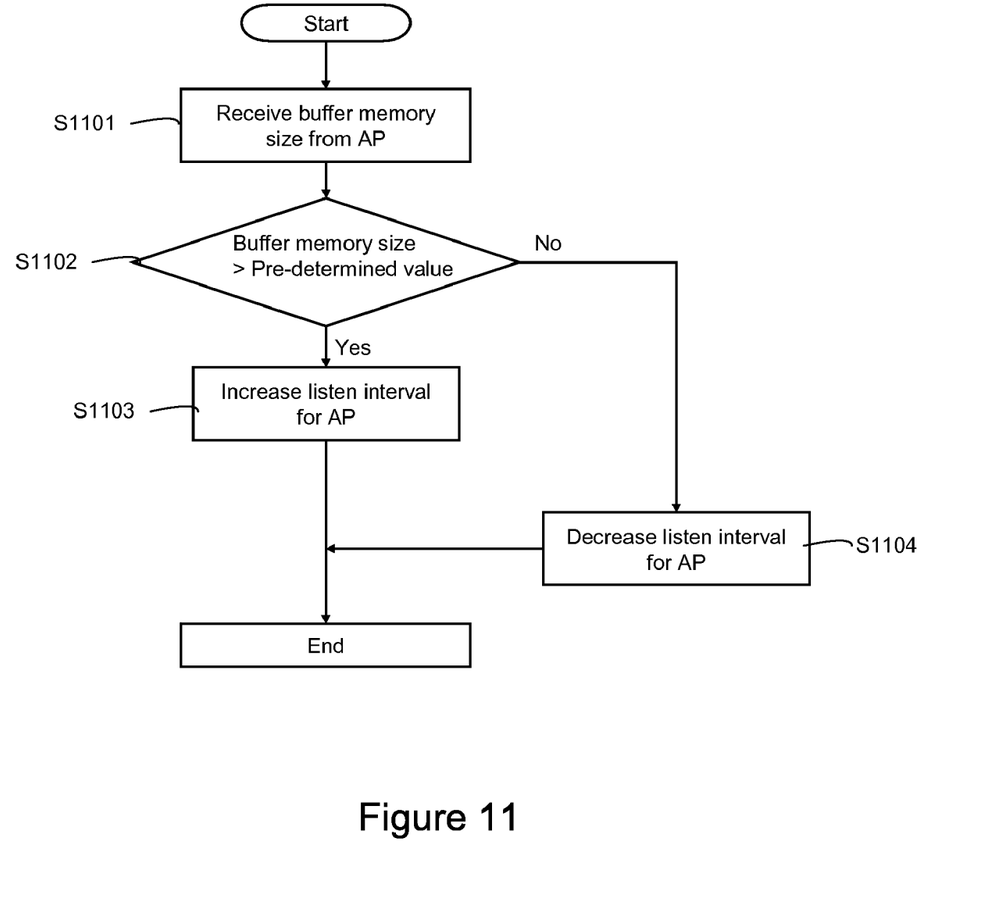
FIG. 11 is a flowchart illustrating communications between a mobile device and an access point.

FIG. 11 is a flowchart illustrating yet another exemplary adjustment of a listen interval at a mobile device. The mobile device receives a buffer memory size allocated to it by an access point (S1101). The mobile device compares the buffer memory size to a predetermined value (S1102). If the allocated buffer memory size is greater than the predetermined value, the mobile device increases its listen interval, so that it can receive or transmit more data to or from the access point (S1103). On the other hand, if the buffer size is less than the predetermined value, then the mobile device decreases the duration of its listen interval because it does not have as much data to receive from the access point during the shorter listen interval (S1104). Alternatively, the mobile device may keep the duration of its listen interval the same if no change in the duration of the listen interval is deemed necessary.

Figure 12:
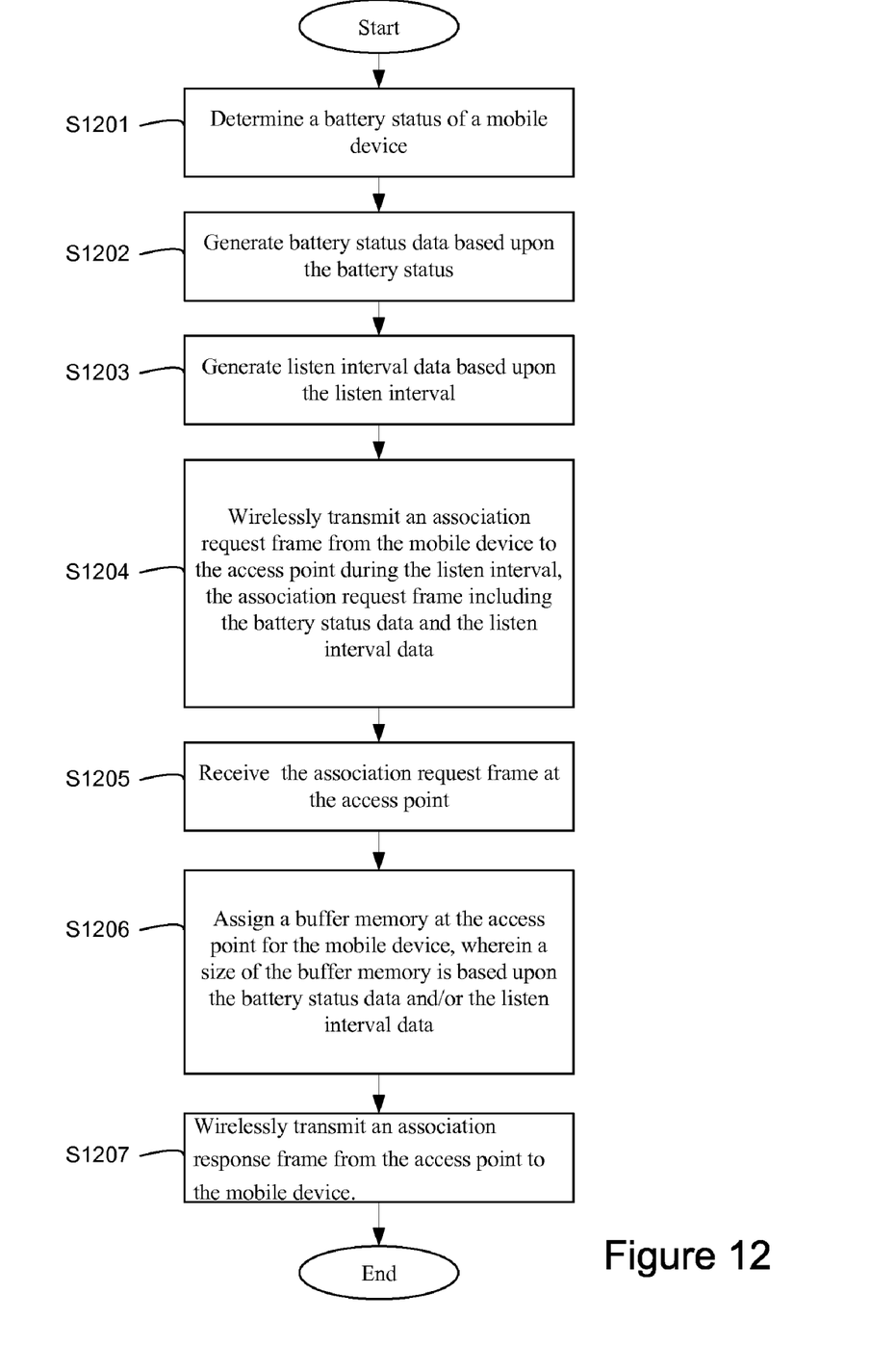
FIG. 12 is a flowchart illustrating communications between a mobile device and an access point.

FIG. 12 is a flowchart illustrating a method of communications between a mobile device and an access point. The mobile device determines a battery status of a mobile device (S1201). The mobile device then generates battery status data based upon the battery status (S1202). The battery status may be indicative of a remaining battery power. The battery status data may also be generated as a binary number.

The mobile device adjusts a listen interval between the mobile device and an access point based upon the battery status (S1202). Adjusting the listen interval may be based upon the battery status and a predetermined battery status threshold. In another example, the listen interval may be a function of the remaining battery power. For example, when the remaining battery power is above 70% of maximum battery power the listen interval is expressed by time T, when the remaining battery power is at 40% to 70% of maximum battery power the listen interval is expressed by time 2T, and when the remaining battery power is under 40% of maximum battery power the listen interval is expressed by time 5T.

A size of the buffer memory may also be a function of the remaining battery power. For example, when the remaining battery power is above 70% of maximum battery power the size of the buffer memory is expressed as size S, when the remaining battery power is at 40% to 70% of maximum battery power the size of the buffer memory is expressed as size 2S, and when the remaining battery power is under 40% of maximum battery power the size of the buffer memory is expressed as size 3S.

The mobile device generates listen interval data based upon the listen interval (S1203). Finally, the mobile device wirelessly transmits an association request frame from the mobile device to the access point during the listen interval, with the association request frame including the battery status data and the listen interval data (S1204). The association request frame may also include capability information, service set identification ("SSID") data, and/or supported rate data.

At the access point, the access point receives the association request frame (S1205). The access point assigns a buffer memory at the access point for the mobile device, wherein a size of the buffer memory is based upon the battery status data and/or the listen interval data (S1206). Finally, the access point wirelessly transmits an association response frame from the access point to the mobile device (S1207). The association response frame may also include capability information, status code data, an association identification ("AID"), supported rate data, and/or an indication of a size of a buffer memory at the access point. In addition, the access point may store data intended for the mobile device in the assigned buffer memory and wirelessly transmit the data stored in the assigned buffer memory to the mobile device.

It is understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components The arrangements have been described with particular illustrative embodiments. It is to be understood that the concepts and implementations are not however limited to the above-described embodiments and that various changes and modifications may be made.

What is claimed is:

1. A method comprising:
   determining a remaining battery power of a mobile device;
   generating battery status data based upon the determined remaining battery power;
   adjusting a listen interval between the mobile device and an access point of a wireless network based upon the remaining battery power;
   generating listen interval data based upon the adjusted listen interval;
   wirelessly transmitting an association request frame from the mobile device to the access point, the association request frame including the battery status data or the listen interval data;
   receiving the association request frame at the access point;
   adjusting, at the access point, a size of a buffer memory associated with the mobile device, wherein the size of the buffer memory is always increased when the battery status data is less than a first threshold or the listen interval data is greater than a second threshold, and the size of the buffer memory is maintained when the battery status data is greater than the first threshold or the listen interval data is less than the second threshold; and
   wirelessly transmitting an association response frame from the access point to the mobile device.

2. The method of claim 1, wherein when the remaining battery power is above 70% of maximum battery power the size of the buffer memory is expressed as size S, when the remaining battery power is at 40% to 70% of maximum battery power the size of the buffer memory is expressed as size 2S, and when the remaining battery power is under 40% of maximum battery power the size of the buffer memory is expressed as size 3S.

3. The method of claim 1, wherein the association request frame further comprises capability data, service set identification ("SSID") data, or supported rate data.

4. The method of claim 1, wherein the battery status data is a generated as a binary number.

5. The method of claim 1, wherein the association response frame further comprises capability data, status code data, an association identification ("AID"), supported rate data, or an indication of a size of a buffer memory at the access point.

6. The method of claim 1, further comprising:
   storing data intended for the mobile device in the adjusted buffer memory; and
   wirelessly transmitting the data stored in the adjusted buffer memory to the mobile device.

7. The method of claim 1, wherein when the remaining battery power is above a predetermined battery power the size of the buffer memory is deceased, and wherein when the remaining battery power is under a predetermined battery power the size of the buffer memory is increased.

8. A system comprising:
   a mobile device, further comprising:
      a battery,
      a controller configured to determine a remaining battery power of the battery, to generate battery status data based upon the determined remaining battery power, to adjust a listen interval based upon the remaining battery power, and to generate listen interval data based upon the adjusted listen interval, and
      a transceiver configured to wirelessly transmit an association request frame, the association request frame including the battery status data or the listen interval data, and to wirelessly receive an association response frame, the association response frame further comprising data, the size of the data based upon the battery status data and/or the listen interval data; and
   an access point device, further comprising:
      a transceiver configured to wirelessly receive the association request frame from a mobile device, and to wirelessly transmit the association response frame to the mobile device, the association response frame further comprising data stored in a buffer memory,
      a controller configured to adjust, at the access point, a size of the buffer memory, wherein the size of the buffer memory is always increased when the battery status data is less than a first threshold or the listen interval data is greater than a second threshold, and the size of the buffer memory is maintained when the battery status data is greater than the first threshold or the listen interval data is less than the second threshold, and
      a memory medium configured to store the data in the buffer memory.

9. The method of claim 8, wherein when the remaining battery power is above a predetermined battery power the size of the buffer memory is deceased, and wherein when the remaining battery power is under a predetermined battery power the size of the buffer memory is increased.

10. A system comprising:
    one or more computers; and
    a memory medium coupled to the one or more computers having instructions stored thereon which, when executed by the one or more computers, cause the one or more computers to perform operations comprising:
       determining a remaining battery power of a mobile device,
       generating battery status data based upon the determined remaining battery power,
       adjusting a listen interval between the mobile device and an access point of a wireless network based upon the remaining battery power,
       generating listen interval data based upon the adjusted listen interval,
       wirelessly transmitting an association request frame from the mobile device to the access point, the association request frame including the battery status data or the listen interval data,
       receiving the association request frame at the access point,
       adjusting, at the access point, a size of a buffer memory associated with the mobile device, wherein the size of the buffer memory is always increased when the battery status data is less than a first threshold or the listen interval data is greater than a second threshold, and the size of the buffer memory is maintained when the battery status data is greater than the first threshold or the listen interval data is less than the second threshold, and wirelessly transmitting an association response frame from the access point to the mobile device.

11. The system of claim 10, wherein when the remaining battery power is above 70% of maximum battery power the size of the buffer memory is expressed as size S, when the remaining battery power is at 40% to 70% of maximum battery power the size of the buffer memory is expressed as size 2S, and when the remaining battery power is under 40% of maximum battery power the size of the buffer memory is expressed as size 3S.

12. The method of claim 10, wherein the association response frame further comprises capability data, status code data, an association identification ("AID"), supported rate data, or an indication of a size of a buffer memory at the access point.

13. The method of claim 10, wherein when the remaining battery power is above a predetermined battery power the size of the buffer memory is deceased, and wherein when the remaining battery power is under a predetermined battery power the size of the buffer memory is increased.

* * * * *